(12) United States Patent
Keating et al.

(10) Patent No.: US 7,798,301 B2
(45) Date of Patent: Sep. 21, 2010

(54) SEGMENTED CORE PLATE AND FRICTION DISC

(75) Inventors: Martin P. Keating, Plainfield, IL (US); Michael Roche, Tinley Park, IL (US); Michael Wagner, Bruhl (DE); Dirk Neubauer, Hemsbach (DE)

(73) Assignee: BorgWarner Inc., Auburn Hills, MI (US)

( * ) Notice: Subject to any disclaimer, the term of this patent is extended or adjusted under 35 U.S.C. 154(b) by 672 days.

(21) Appl. No.: 11/708,553

(22) Filed: Feb. 20, 2007

(65) Prior Publication Data

US 2007/0193847 A1     Aug. 23, 2007

Related U.S. Application Data

(60) Provisional application No. 60/775,492, filed on Feb. 21, 2006.

(51) Int. Cl.
*F16D 13/64* (2006.01)
(52) U.S. Cl. ............. 192/70.12; 192/70.14; 192/107 R; 192/113.36
(58) Field of Classification Search .................. None
See application file for complete search history.

(56) References Cited

U.S. PATENT DOCUMENTS

| | | | |
|---|---|---|---|
| 1,808,511 A | 6/1931 | Robbins | |
| 2,237,624 A * | 4/1941 | Oldham | 192/107 R |
| 2,794,526 A * | 6/1957 | Canfield | 192/113.36 |
| 4,260,047 A | 4/1981 | Nels | |
| 4,449,621 A | 5/1984 | F'Geppert | |
| 4,674,616 A | 6/1987 | Mannino, Jr. | |
| 4,967,893 A | 11/1990 | Vogele | |
| 5,332,075 A | 7/1994 | Quigley | |
| 5,413,194 A | 5/1995 | Kulis | |
| 5,439,087 A | 8/1995 | Umezawa | |
| 5,460,255 A | 10/1995 | Quigley | |
| 5,571,372 A | 11/1996 | Miyaishi | |
| 5,647,466 A | 7/1997 | Umezawa | |
| 5,713,450 A | 2/1998 | Quigley | |
| 5,730,259 A | 3/1998 | Umezawa | |
| 5,810,644 A | 9/1998 | Schmidt | |
| 5,823,314 A | 10/1998 | Suzuki | |
| 5,897,737 A | 4/1999 | Quigley | |
| 5,927,457 A | 7/1999 | Orlamunder | |
| 6,062,367 A | 5/2000 | Hirayanagi | |
| 6,138,807 A | 10/2000 | Saito | |
| 6,283,265 B1 | 9/2001 | Hirayanagi | |
| 6,308,397 B1 | 10/2001 | Nishimura | |

(Continued)

FOREIGN PATENT DOCUMENTS

EP      0115211 A2     8/1984

(Continued)

OTHER PUBLICATIONS

PCT/US2006/039037 Form PCT/ISA/220/210/237 International Search Report and Written Opinion Mailed Feb. 2, 2007 for BorgWarner Inc.

*Primary Examiner*—Rodney H Bonck
(74) *Attorney, Agent, or Firm*—Reising Ethington P.C.

(57) ABSTRACT

Segmented steel core plates for either double sided or single sided wet clutch friction plates or separator plates and a process for making the same are disclosed.

17 Claims, 16 Drawing Sheets

U.S. PATENT DOCUMENTS

| | | |
|---|---|---|
| 6,345,711 B1 | 2/2002 | Sullivan |
| 6,370,755 B1 | 4/2002 | Wakamori |
| 6,381,822 B1 | 5/2002 | Watanabe |
| 6,409,006 B1 | 6/2002 | Wakamori |
| 6,500,294 B1 | 12/2002 | Honda |
| 6,520,301 B2 | 2/2003 | Young |
| 6,572,726 B2 | 6/2003 | Shimoi |
| 6,586,373 B2 | 7/2003 | Suzuki |
| 6,596,119 B2 | 7/2003 | Honda |
| 6,601,684 B2 | 8/2003 | Collis |
| 6,655,519 B2 | 12/2003 | Wakamori |
| 6,668,891 B2 | 12/2003 | Collis |
| 6,675,942 B2 | 1/2004 | Suzuki |
| 7,478,719 B2 | 1/2009 | Voegele |
| 2002/0007996 A1 | 1/2002 | Larson |
| 2002/0017444 A1 | 2/2002 | Diemer |
| 2002/0038748 A1 | 4/2002 | Gu |
| 2002/0043441 A1 | 4/2002 | Fujita |
| 2002/0046912 A1 | 4/2002 | Suzuki |
| 2002/0050434 A1 | 5/2002 | Diemer |
| 2002/0058728 A1 | 5/2002 | Takahara |
| 2003/0015392 A1 | 1/2003 | Shoji |
| 2003/0038013 A1 | 2/2003 | Ichikawa |
| 2003/0062237 A1 | 4/2003 | Ziegler |
| 2003/0075412 A1 | 4/2003 | Heiartz |
| 2003/0118830 A1 | 6/2003 | Umezawa |
| 2003/0168163 A1 | 9/2003 | Sakai |
| 2003/0188950 A1 | 10/2003 | Kinoshita |
| 2006/0144668 A1 * | 7/2006 | Voegele ............... 192/107 R |
| 2008/0314713 A1 * | 12/2008 | Vogele et al. ........... 192/107 R |

FOREIGN PATENT DOCUMENTS

| | | |
|---|---|---|
| EP | 1650454 A1 | 4/2006 |
| GB | 931031 | 7/1963 |

\* cited by examiner

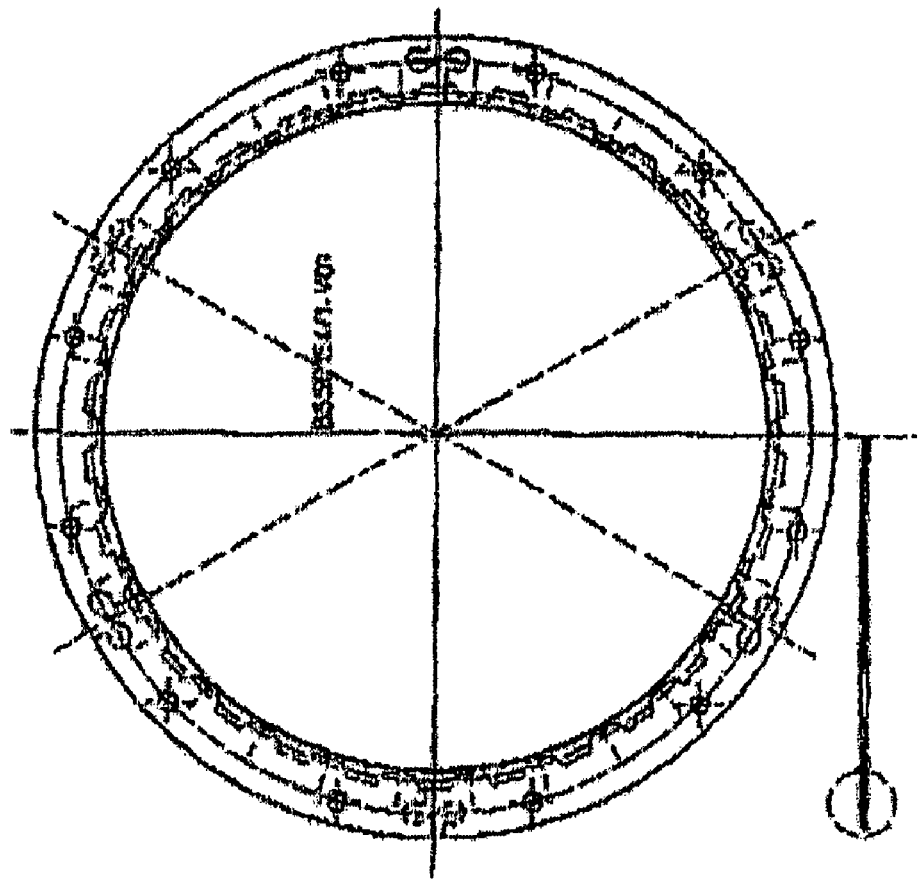
Fig. 6a
Fig. 6b
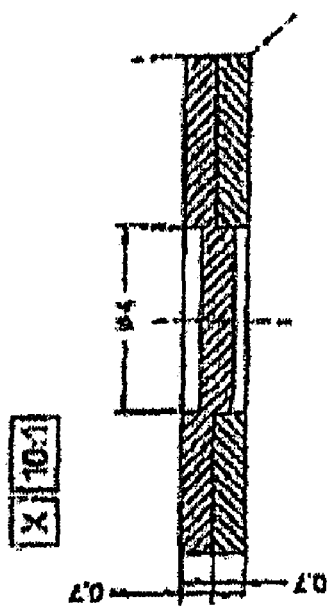
Fig. 6c

SEGMENTED CORE PLATE AND FRICTION DISC

CROSS REFERENCE TO RELATED APPLICATIONS

This application claims the benefit of U.S. provisional patent application Ser. No. 60/775,492 filed on Feb. 21, 2006.

The present invention relates to segmented steel core plates for either double sided or single sided wet clutch friction plates or separator plates and a process for making the same.

BACKGROUND OF THE INVENTION

The present invention relates to steel core plates or discs which are used in multi-plate wet clutch packs for automatic transmissions or transfer cases for vehicles or other friction clutch applications where an annular core plate is segmented with interlocking end portions to form an annular ring. Annular friction rings or discs are conventionally used in wet clutch packs of interleaved clutch plates that are alternately connected to an inner hub and an outer drum of a clutch assembly. The clutch plates are engaged to rotate the parts of the clutch assembly together by a hydraulically or spring-actuated piston. A friction plate or disc normally consists of an annular steel ring or plate, which serves as a core plate and a pair of annular friction facings that are riveted or otherwise secured to the core plate to complete the friction disc.

In the manufacturing process, blanking out of friction rings and annular core plates produces considerable waste. The U.S. Pat. No. 4,260,047 to Nels use an annular core plate and segmented friction facings having tab and slot interlocking ends. The friction facings consist of quarter circle segments which are blanked out of a rectangular sheet of friction material that is formed with a plurality of parallel grooves, with the tabs and slots formed in ungrooved portions. The segments are interconnected to form a ring and are bonded to the core plate.

The Mannino, Jr., U.S. Pat. No. 4,674,616 patent, owned by the common assignee herein, relates to a friction disc with a segmented core and segmented facings. In the Mannino patent, the core plate has a plurality of arcuate segments with tab and slot end portions which interlock to form an annular core plate. The friction facings are also formed of arcuate segments that overlap the interlocking end portions of the core plate and are suitably bonded thereto on both faces. The facing segments do not need to be interconnected together and the bonding of the friction segments to the interlock core plate segments in an overlapping manner prevents disassembly of the core plate. Both the interlocking core plate segments and friction facing segments are perforated to permit use of alignment pins for handling orientation and alignment of the segments for assembly and bonding.

Although these and other similar methods reduce the waste friction material, the multi-step manufacturing processes and waste of material in blanking out the core plate remains. The present invention provides improvements on these plates and processes for making the plates.

SUMMARY OF THE INVENTION

In one aspect, the present invention relates to an annular core plate which is segmented with interlocking end portions to form a ring. In certain embodiments, the core plate or friction disc comprises "prime" segments, i.e. where the number of spline teeth is divisible by 3 segments. In other embodiments, the friction disc comprises "non-prime" segments, i.e., where the number of spline teeth is not evenly divisible by 3 segments. Two or more of these segmented steel core plates, formed either with the prime or non-prime segments, are joined together to form what is generally called a "stack" or "clutch pack" in the industry.

In another embodiment, one or more of the prime or non-prime segments are missing from an annular ring in a stack that contains three or more annular rings that channels are formed through the stack to allow oil to flow through the clutch pack.

In yet another embodiment, openings are stamped, or formed, into the segments that are stacked or laminated together. The openings intersect circumferentially and create offset radial channels or openings into opposite edges of the segment to form oil passages into the plate or disc.

The present invention increases the efficiency of manufacturing steel core plates and separator plates by reducing the amount of scrap material from the manufacturing process.

In another aspect of the present invention provides a method for making segments and assembly of the segments into a single ply or thickness core plate.

Other objects and advantages of the present invention will become apparent to those skilled in the art upon a review of the following detailed description of the preferred embodiments and the accompanying drawings.

DESCRIPTION OF THE DRAWINGS

FIGS. 6A, 6B and 6C show the laminated riveted core plate: FIG. 6A is a plan view, FIG. 6B is a partial cross section, and FIG. 6C is an exploded cross sectional view taken from FIG. 6B.

DESCRIPTION OF THE INVENTION

The present invention is useful for both producing core plates having either prime or non-prime number of spine teeth on the core plates. According to the present invention, the segments are considered "prime" if the number of spine teeth on the disc is divisible by three or five segments.

Figure 1A:
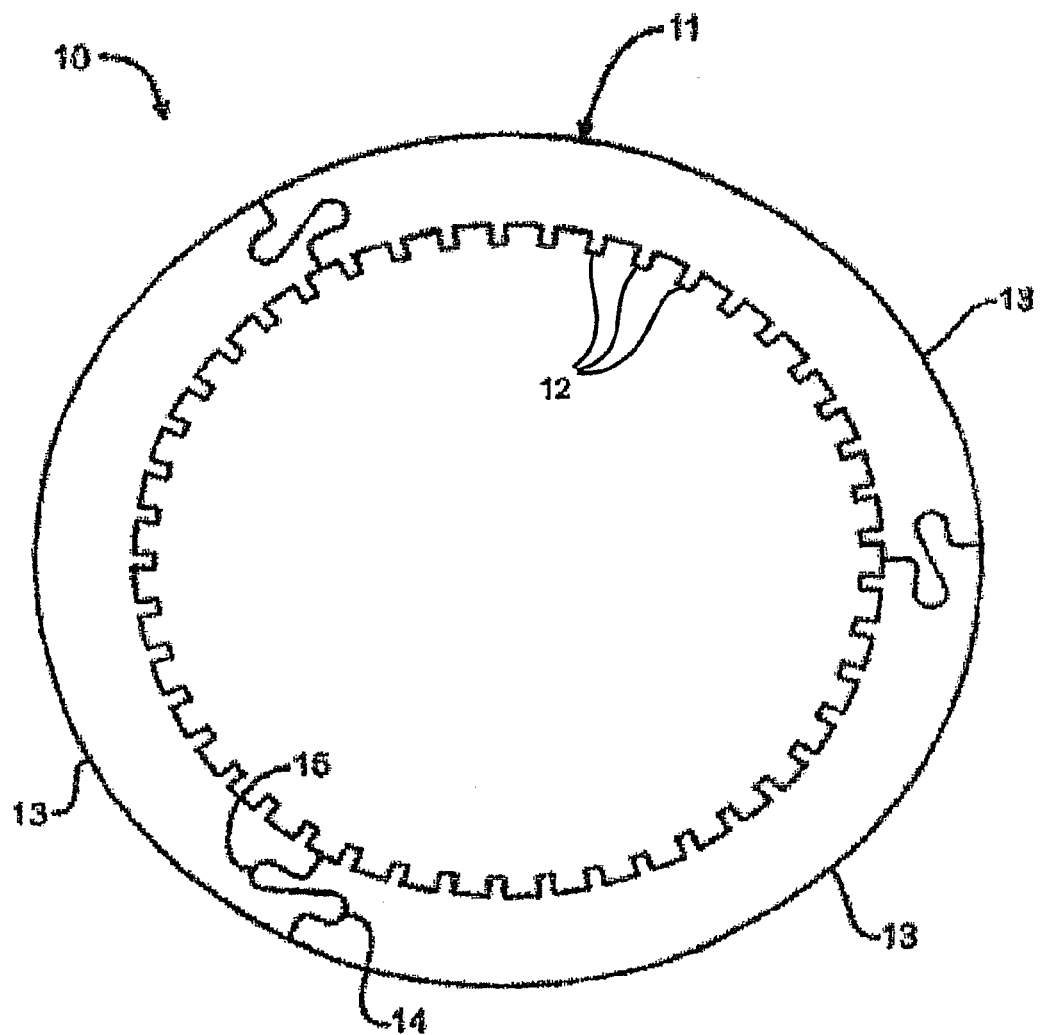
FIG. 1A is a plan view of a friction disc comprising "prime" segments, i.e. where the number of spline teeth is divisible by 3 segments.

FIG. 1A shows a multi-plate clutch pack 10 for an automatic transmission or for other suitable clutch plate applications. The multi-plate clutch pack 10 includes a plurality of plates. For ease of explanation, one plate will be discussed in detail. The core plate 11 has a plurality of teeth 12. The teeth 12 may be on either the inner or outer periphery of the plate 11. The core plate 11 is comprised of three identical arcuate segments 13. Each segment 13 has a tab 14 and a slot 15 at opposing ends of the segment. The tab 14 and the slot 15 at either end are complimentary to and conformably receiving a tab 14 in a slot 15 in the next adjacent segment. It is to be understood that other shapes of tab and slot arrangements are useful with the present invention and such various combinations are shown in FIGS. 7A thru 7F herein. In the embodiment shown in FIG. 1A, the segmented core plate has 45 teeth, which is evenly divisible by 3. Thus, the segments 13 are identical in shape.

Figure 1B:
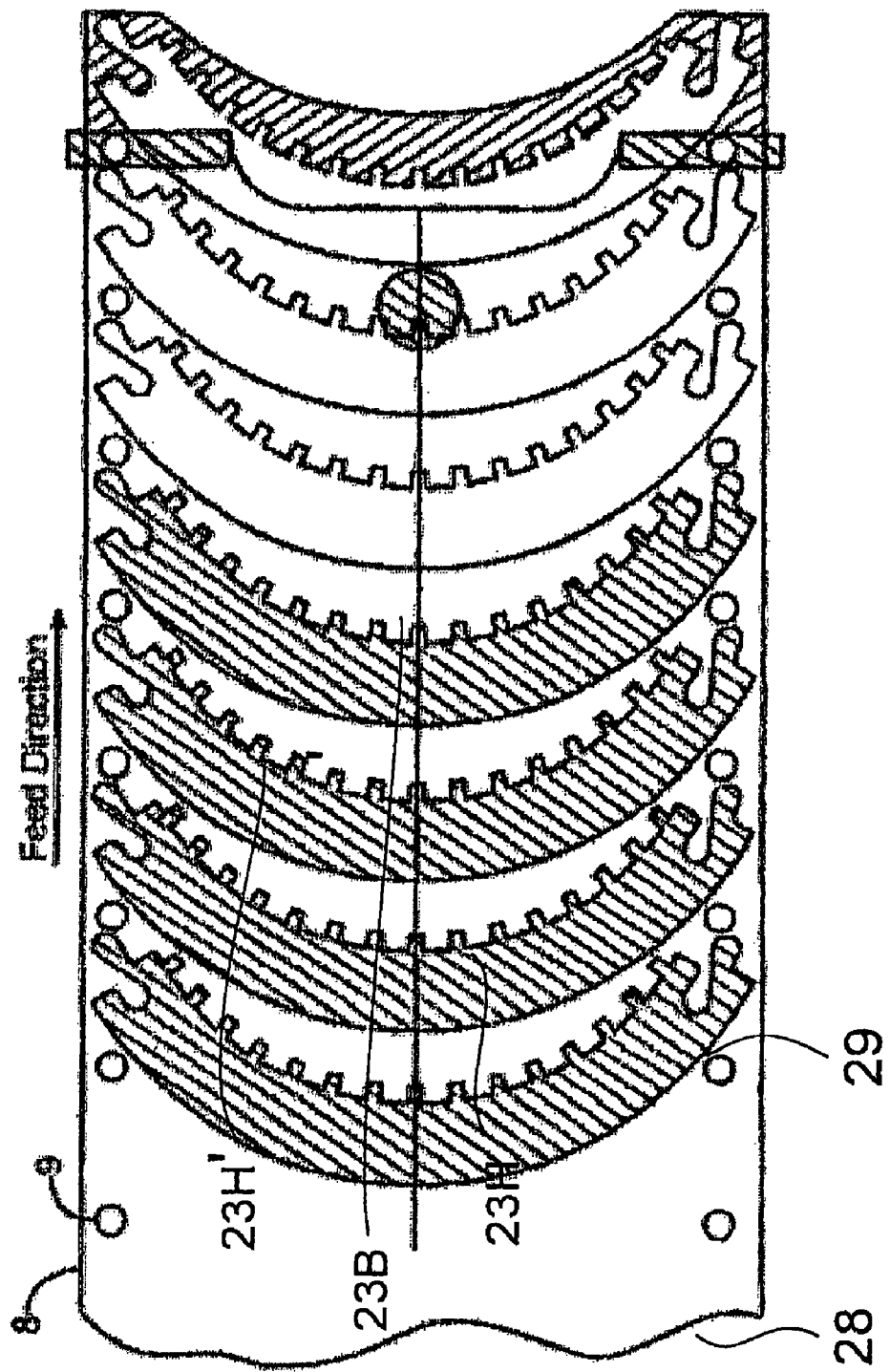
FIG. 1B is a plan schematic view of a blanking process for segments where segments are punched.

FIG. 1B shows identical segments 13 which are stamped from a suitable sheet of steel 8. The sheet has guide holes 9 for guiding the sheet 8 through a suitable stamping device (not shown). In such stamping operation, the stamping and/or punch out for segmenting and laminating steel core plates can be done in any suitable manner. The materials are then advanced to a knockout station.

Figure 2A:
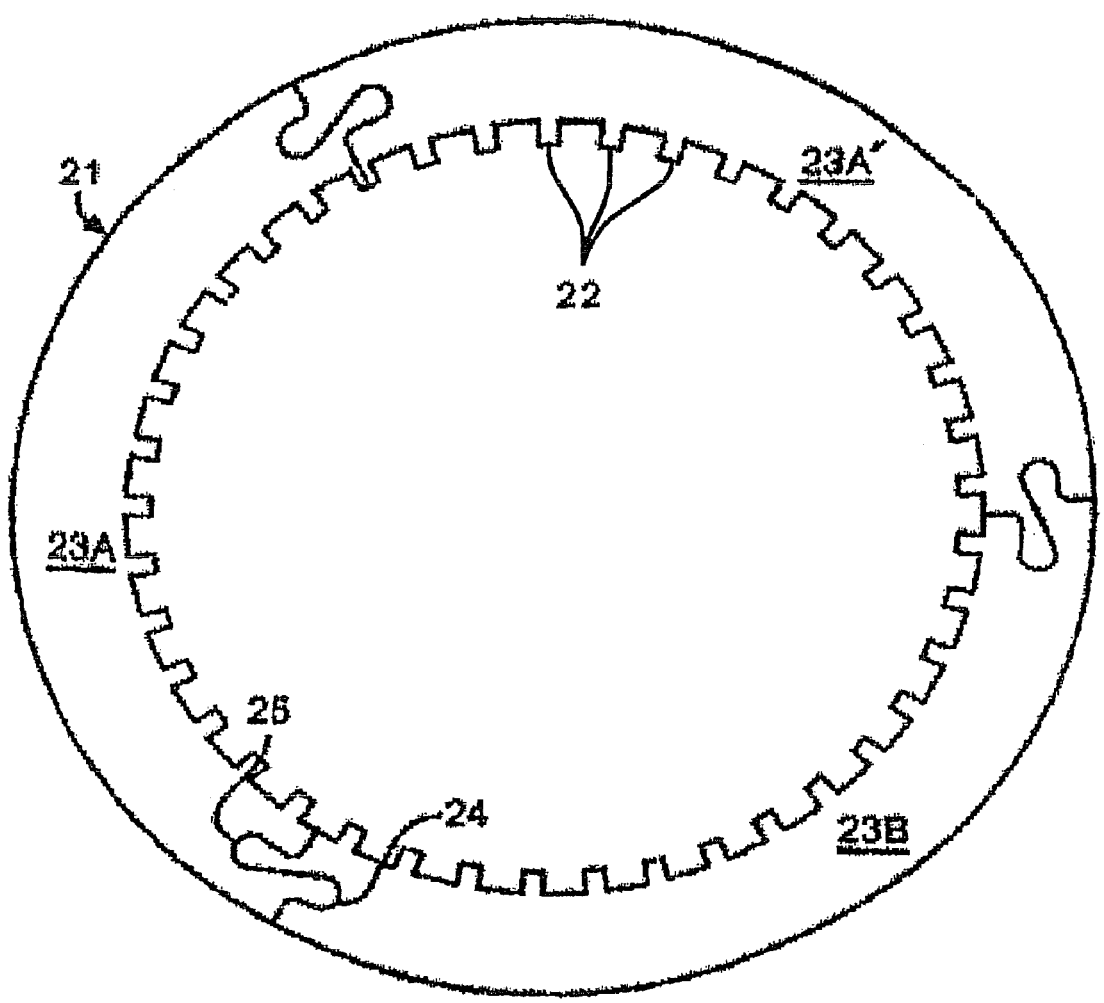
FIG. 2A is a plan view of a friction disc comprising "prime" segments, i.e., where the number of spline teeth is not evenly divisible by 3 or 5 segments.

FIG. 2A discloses a friction disc or clutch plate 20 which may be utilized in a multi-plate clutch pack for an automatic transmission or for other suitable clutch plate applications. The friction disc 20 includes a steel core plate 21 having a plurality of teeth 22. The teeth 22 may be on either the inner or outer periphery of the plate 21. The core plate 21 is comprised of three arcuate segments 23. Each segment 23 has a tab 24 and a slot 25 at opposing ends of the segment. The tab 24 and the slot 25 at either end are complimentary to and conformably receiving a tab 24 in a slot 25 in the next adjacent segment. It is to be understood that other shapes of tab and slot arrangements are useful with the present invention and such various combinations are shown in FIGS. 7A thru 7F herein.

In the embodiment shown in FIG. 2A, the segmented core plate 21 has 41 teeth, which number is not evenly divisible by 3 or 5. Thus, the core plate 21 is referred to as "non-prime" since number of teeth, 41, is not evenly divisible by 3 or 5. The non-prime core plate 21 includes a first segment 23A, a second segment 23A' which is identical to the first segment 23A, and a third segment 23B which is different from the first and second segments 23A and 23A'. Also, FIG. 2A shows the arcuate length of each segment where segments 23A and 23A' have an arcuate measurement or length that is slightly less than the accurate measurement or length of the third segment 23B.

Figure 2B:
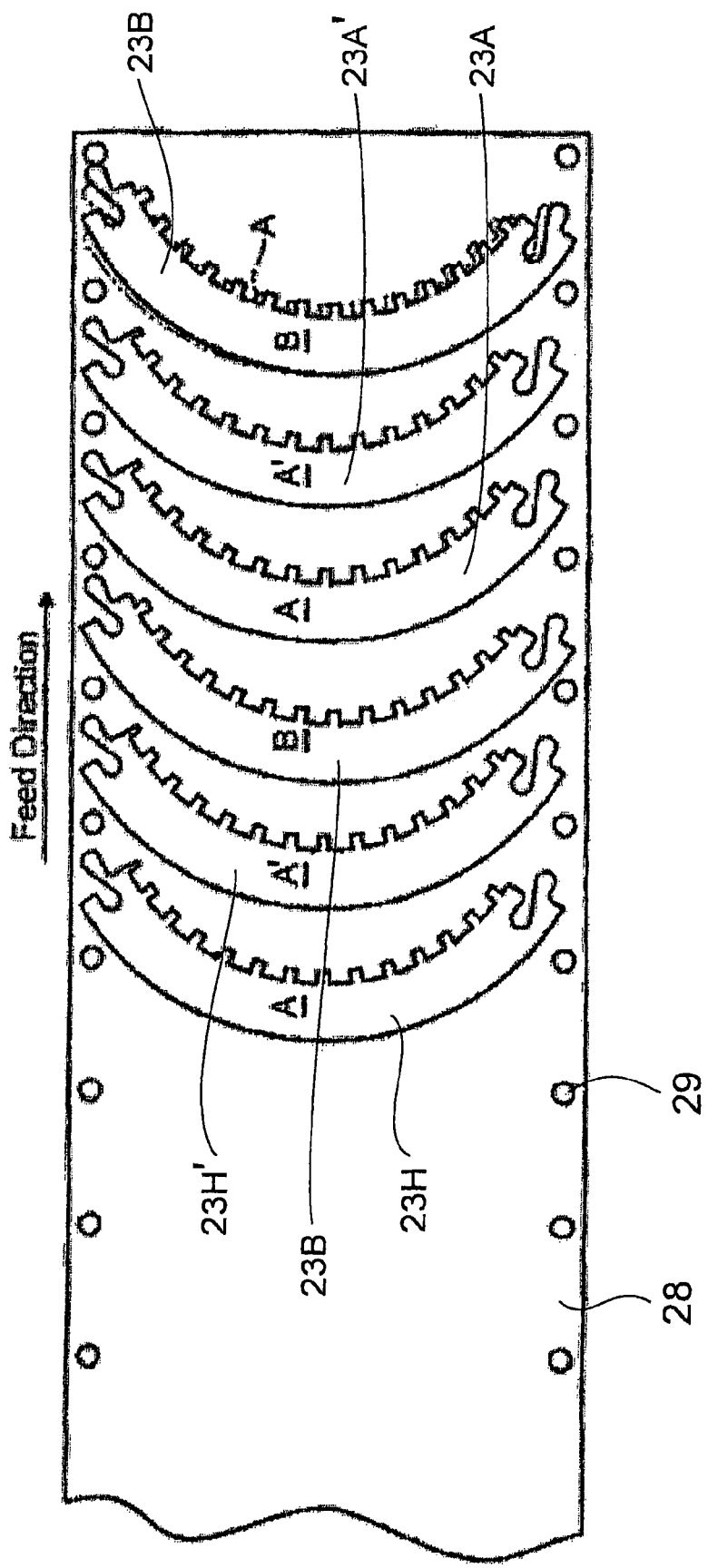
FIG. 2B is a plan schematic view of a blanking process for "non-prime" segments where different segment punches are activated to allow for the "odd" segment.

FIG. 2B is a schematic illustration of a steel sheet 28 which is stamped with identical segments 23A and 23A' and with different segment 23B. The sheet has guide holes 29 for guiding the sheet 28 through a suitable stamping device (which will be generally described later in this document). In such stamping operation, the stamping and/or punch out for segmenting and laminating steel core plates can be done in any suitable manner. The materials are then advanced to a knockout station to remove the completed core plates from the stamping operation.

In certain aspects of the invention, cam activated assemblies are used for the different shaped segment to allow for the segments of different size. For example, a first punch (not shown) is cycled for 2 press strokes to first punch out an A segment and then an A' segment. Thereafter, a second punch (not shown) is activated for one stroke to punch the B segment. When the first cam punch is engaged, the second cam punch is released and does not punch. According to one method of the present invention, a pad blanking processing can be used where the segment is pushed back into the strip. A knockout station, not shown, is used to punch out both the A and B segments.

Figure 3A:
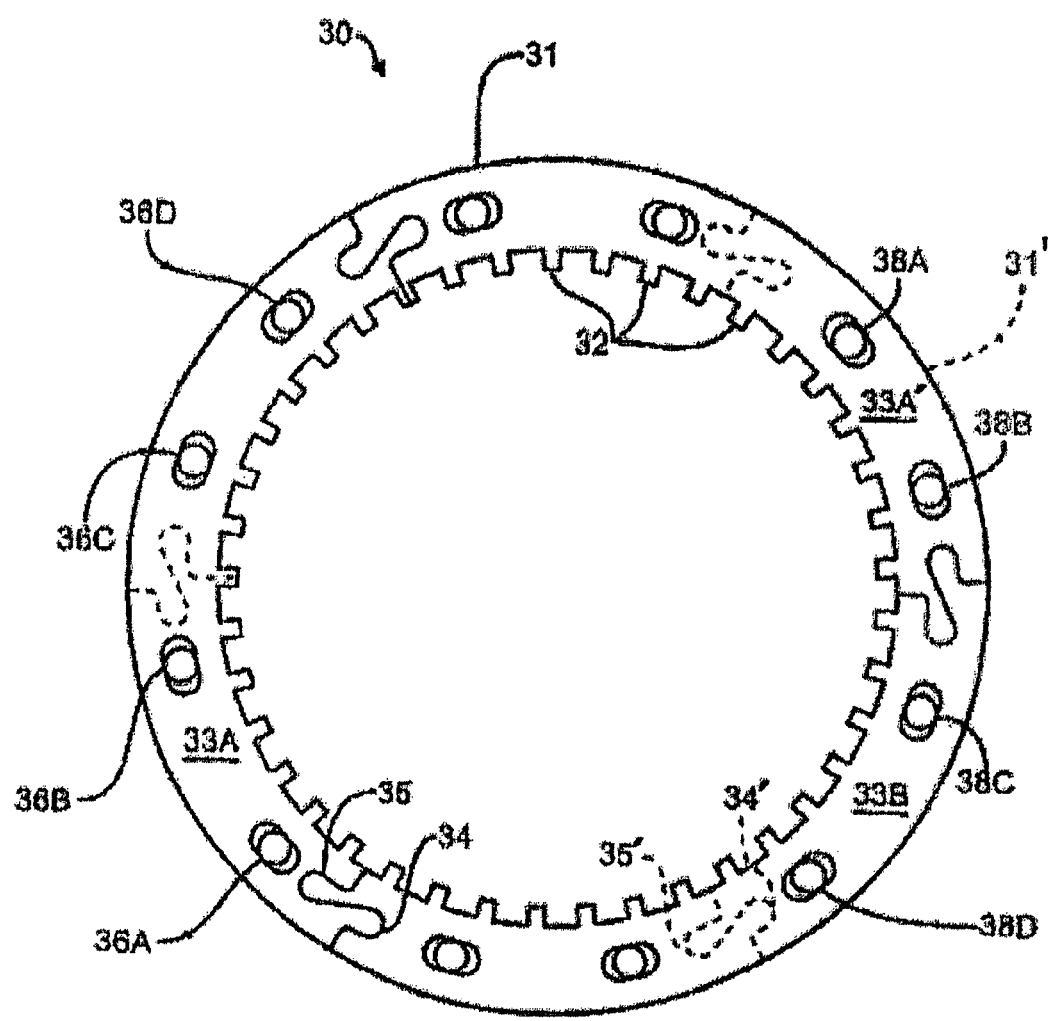
FIG. 3A is a plan view, partially in phantom, of a friction discs having "non-prime" segments.

The present invention relates to non-prime segments formed into a steel core plate which are then laminated together to form a stack. FIG. 3A is a schematic illustration showing core plates interlocked together.

In FIG. 3A, a multi-plate clutch pack 30 for an automatic transmission or for any other suitable clutch plate application is shown. The multi-plate clutch pack 30 includes a plurality of core plates. For ease of explanation, two adjacent core plates will be discussed in detail. As such these two core plates will be referred to as either the first, or upper, core plate 31 and the second, or underlying, core plate 31'. As shown in FIG. 3A, the first core plate 31 has teeth 32 on the inner periphery thereof. Again, it should be understood that the core plates 31 and 31' may have teeth on an outer periphery (not shown).

In certain embodiments, one or more openings can be provided in each segment to receive alignment pins (no shown) for purposes of assembly. When the tabs and slots of the segments are interlocked, an annular plate or ring is formed.

In the embodiment shown in FIG. 3A, the core plate 31 is formed of three arcuate segments: first and second identical segments 33A and 33A', and a third, different, segment 33B. The segments 33A, 33A' and 33B each have a tab 34 and an adjacent slot 35 at each end of the segment. The tab 34 and the slot 35 are complimentary to and conformably receiving an adjacent tab 34 and an adjacent slot 35 on adjacent, and opposing, segments. When the tabs 34 and slots 35 of the segments 33A, 33A' and 33B are interlocked, the annular core plate 31 is formed.

FIG. 3A shows, in phantom, a second core plate 31' behind, and in coaxial alignment with, the first core plate 31. The second core plate 31' is circumferentially rotated with respect to the first core plate 31 such that the interlocking tabs and slots 34 and 35 on the first core plate 30 are circumferentially displaced with respect to interlocking tabs 34' and slots 35' on the second core plate 31'. In certain embodiments, the underlying core plate 31' is circumferentially rotated approximately 60° such that the second set of interlocking tabs and slots 34' and 35' are approximately 60° from the first interlocking tabs and slots 34 and 35.

Figure 3B:
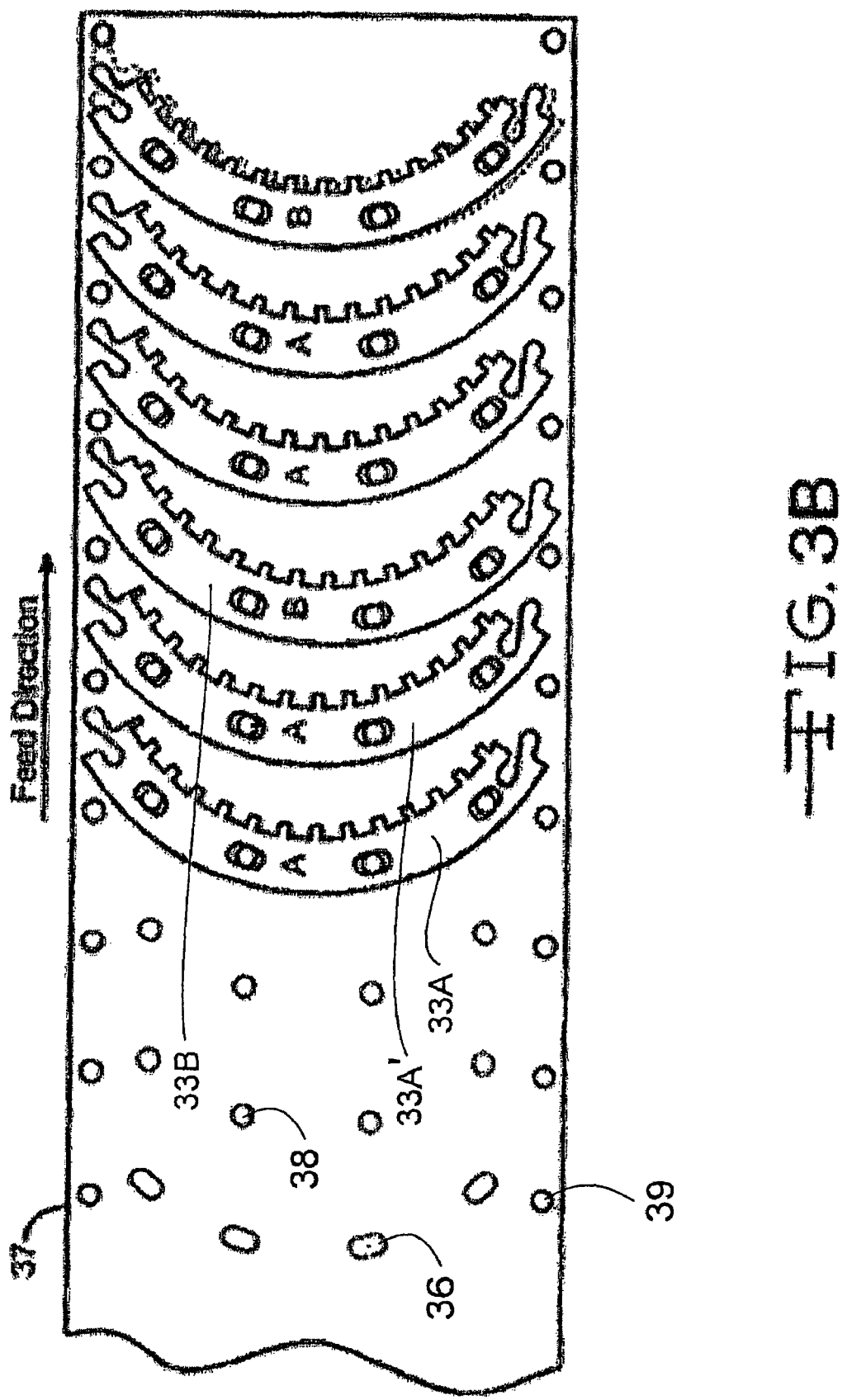
FIG. 3B is a schematic plan view showing a process for stamping "non-prime" segments and further stamping tab lock perforations.
Figure 3C:
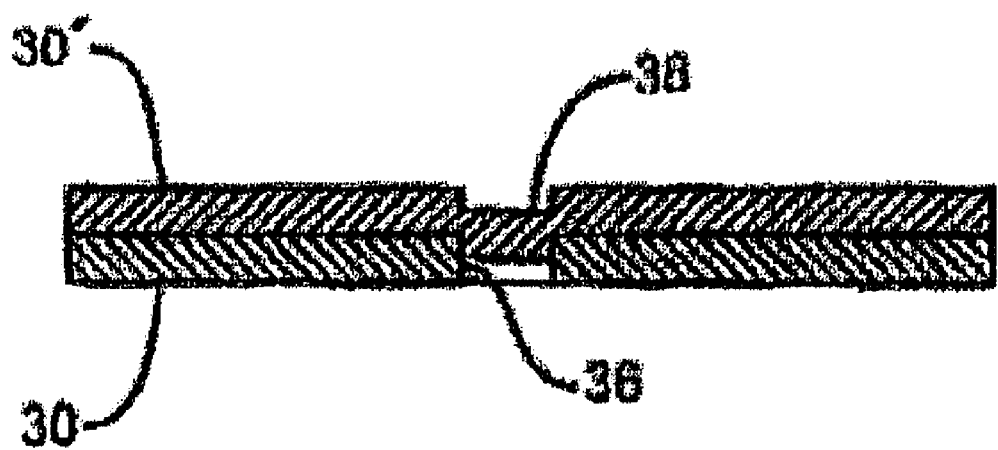
FIG. 3C is a cross sectional view showing a semi-perforation in a first segment and in a second segment.

As shown in FIGS. 3A, 3B, and 3C, the segments 33A, 33A' and 33B of the first core plate 31 can contain a predetermined number of perforations 36. The perforations axially extend through the core plate and can be generally equidistantly spaced apart from adjacent perforations. It is to be understood that, in various embodiments, each segment can have any predetermined desired number of perforations. In the embodiment shown, each segment 33A, 33A' and 33B has four perforations labeled 36A, 36B, 36C, and 36D.

The first, second and third segments 33'A, 33'A' and 33'B of the second, or underlying, core plate 31' contain a plurality of projections 38 for engagement or locking, with adjacent perforations 36 in the first core plate 31. As shown in FIGS. 3A, 3B, and 3C, the segments 33'A, 33'A' and 33'B can contain a predetermined number of projections 38. It is to be understood that each segment can have any predetermined desired number of semi-perforations 38. In the embodiment shown, each segment 33'A, 33'A' and 33'B has four projections labeled 38A, 38B, 38C, and 38D. FIG. 3C shows a schematic illustration of one projection 38 which is used to lock the first core plate 31 to the adjacent core plate 31'. The perforation 36 has the projection 38 extending within the perforation 36. The perforation 36 can have any desired shape that will accommodate any desired shape of projection 38.

Figure 7:
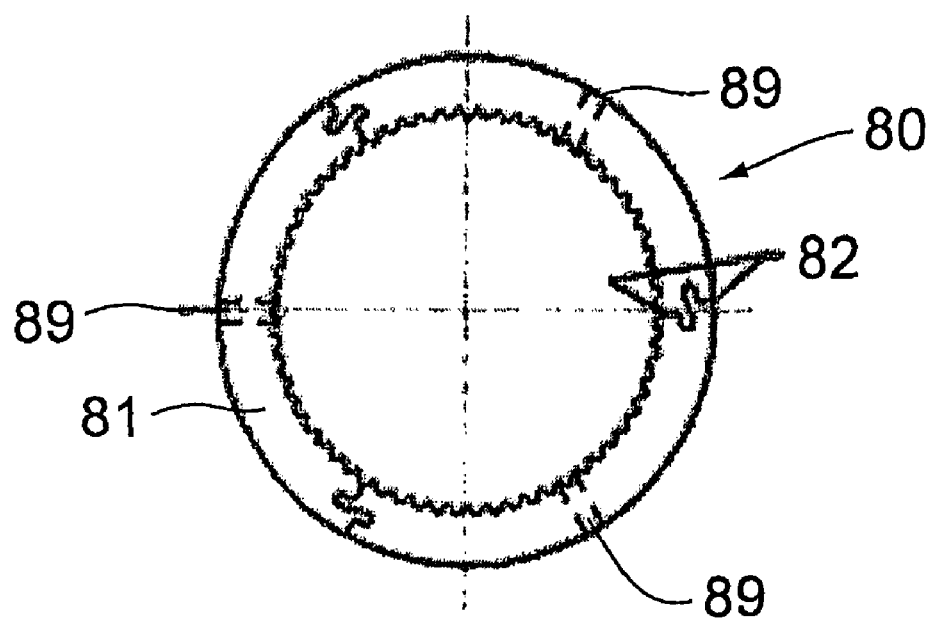
FIG. 7 is a plan view of a stock of core plates formed of multiple segments.
Figure 8:
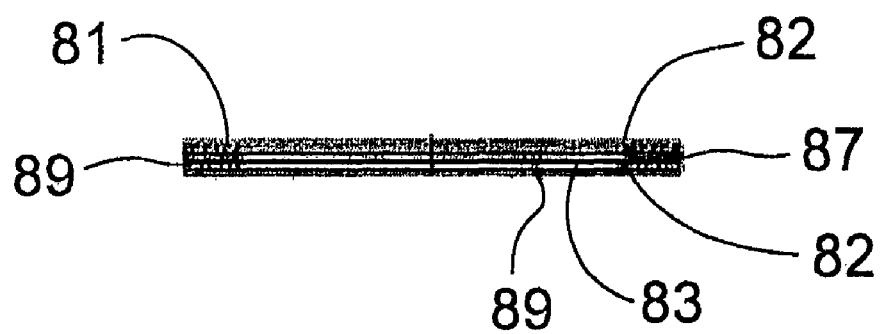
FIG. 8 is a side elevation view of the core plate of FIG. 7.

It should be noted that core plates 31, 31' and any additional core plates comprising the stack 30 can be further strengthened by using suitable processes. For example, an acid etch and glue process can be used. In other manufacturing embodiments, the layers of core plates can also be welded together, using, for example, resistance laser welding or capacitor welding discharge or the like processes. As shown in FIGS. 7 and 8 the welding 82 is applied in the area of the tab 34 and slots 35 on the end of each segment that form the core plates.

Referring now to FIG. 3B a schematic illustration of a sheet 37 with guide holes 39 is shown. The sheet 37 is stamped with the first and second identical segments 33A and 33A' and with different segment 33B. The sheet has guide holes 39 for guiding the sheet 27 through a suitable stamping device (not shown). In such stamping operation, the stamping and/or punch out for segmenting and laminating steel core plates can be done in any suitable manner. The segments are then advanced to a knockout station.

As previously discussed, cam activated assemblies can be used to form the different shaped segment to allow for the odd, or B segment. For example, a first punch (not shown) is cycled for 2 press strokes to first punch out the A segment and then the A' segment. Thereafter, a second punch (not shown) is activated for one stroke to punch the B segment. When the first cam punch segment is engaged, the cam second B punch segment is released and does not punch. According to one method of the present invention, a pad blanking processing can be used where the segment is pushed back into the strip. A knockout station, not shown, is used to punch out both the A, A' and B segments.

In operation, the sheet of material 37 travels in the feed direction of the arrow such that a plurality of guide holes 39, the plurality of tab-lock perforations 36 and projections 38 are first punched or stamped into the sheet 37. The sheet 37 is then blanked using a cam activated punch, for example, to form the segments 33A, 33A', and 33B. Thereafter, the material is knocked out (not shown).

Figure 4:
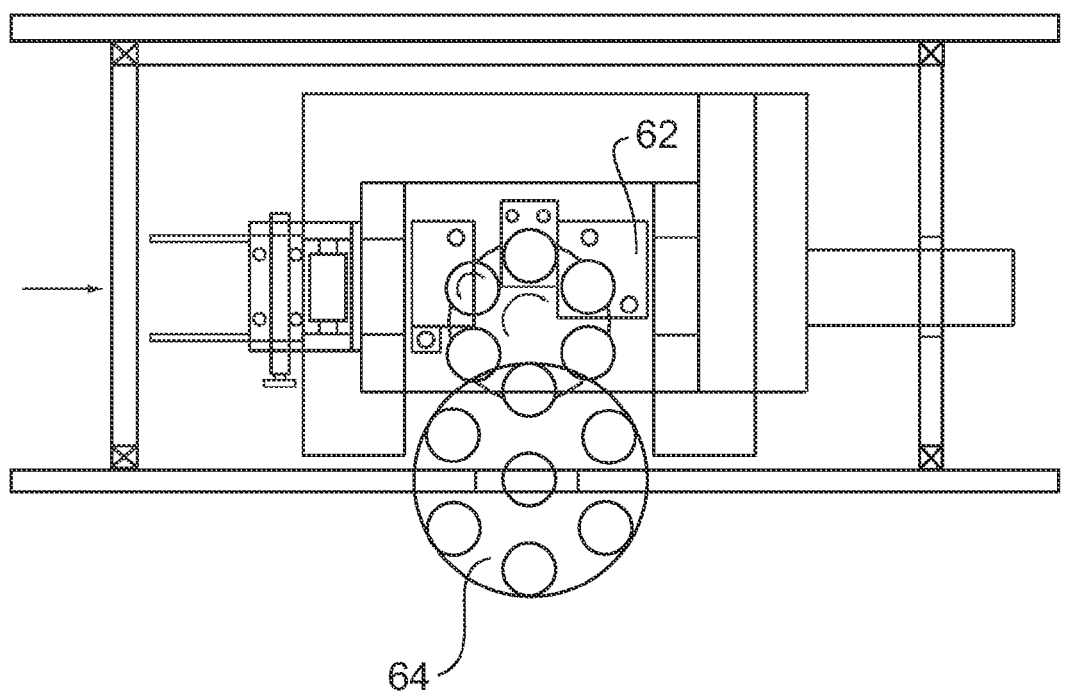
FIG. 4 is a schematic plan view of a die layout for segmenting and lamenting steel core plates.
Figure 5A:
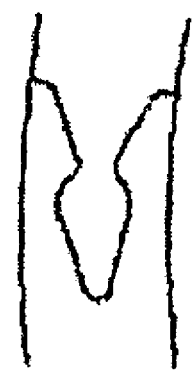
FIGS. 5A-F is schematic illustrations of different joint designs that are useful in connecting segments of the core plate.
Figure 5B:
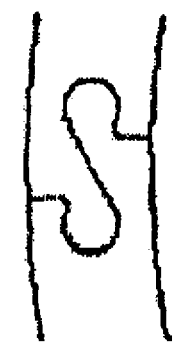
Figure 5C:
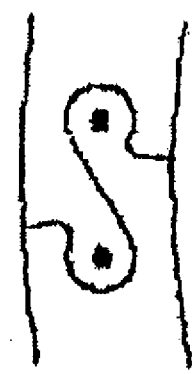
Figure 5D:
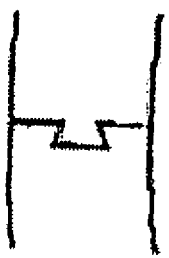
Figure 5E:
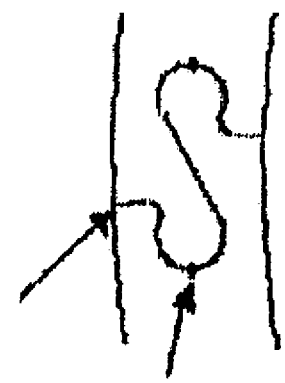
Figure 5F:
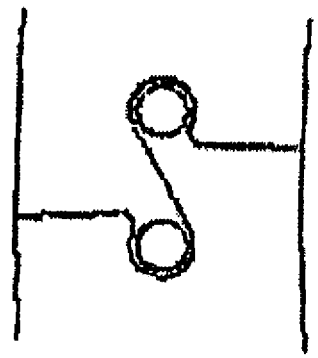

FIG. 4 is a schematic illustration showing one device and process for the assembly of the blank segments into a core plate. The material advances by the roller feed 60 to a servo indexing station 62 and then to the segmented blanking assembly 64 which comprises an indexing table. The assembled segments are then transferred to a stacking assembly 66. It should be understood that various types of assembly apparatus can be used with the present invention.

FIGS. 5A, 5B, 5C, 5D, 5E and 5F are showing schematic illustrations of different joint designs for the tabs 34 and slots 35 which can be used with the blank segments of the present invention. It is important that the tabs 34 and slots 35 form an interlocking joint to secure the segments together so that the joint can effectively resist rotational forces generated during use of the stack 30 of core plates. Also, it should be understood that different punch and die orientations can be used with the present invention.

FIG. 6A is a plan view showing a laminated and riveted core plate. FIG. 6B is a side elevation view and FIG. 6C is a cross-sectional view of an end of the laminated portion showing the projections 38 extending through a perforation and a lower core plate A.

The present invention also contemplates a stack of segment having partial segments missing in a stack of three or more which forms channels to allow flow through the clutch pack. FIGS. 7 and 8 show a friction disc 80 having a stack of core plates formed of multiple segments. There is a first core plate 81 and a second core plate 83 with the first and second core plates having multiple segments as previously described. An interior core plate 87 is positioned between the first and second core plates. The interior core plate is also formed of multiple segments as previously discussed. However, at least one segment is missing on the interior core plate 87 and the at least one missing segment forms at least one channel 89 through the friction disk. The channel 89 allows lubrication fluid used with the friction disk to flow through the friction disk and more readily remove heat from the friction disk 80.

Figure 10:
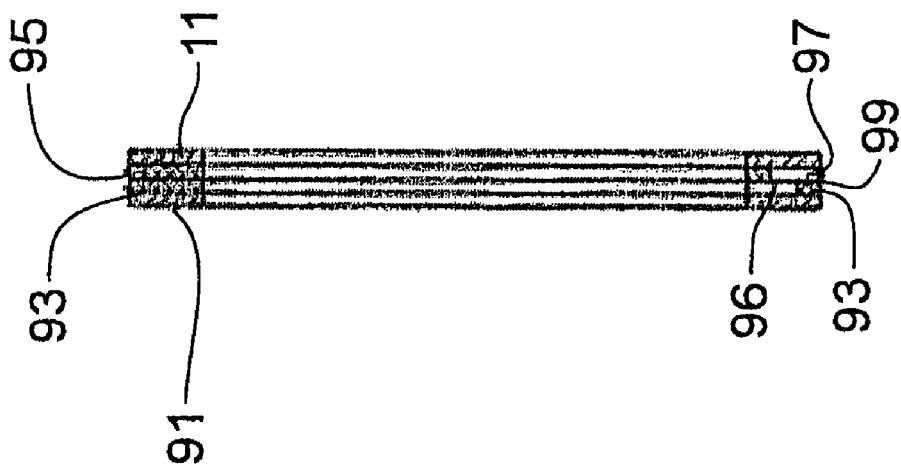
FIG. 10 is a side elevation view of the friction disk of FIG. 9.
Figure 9:
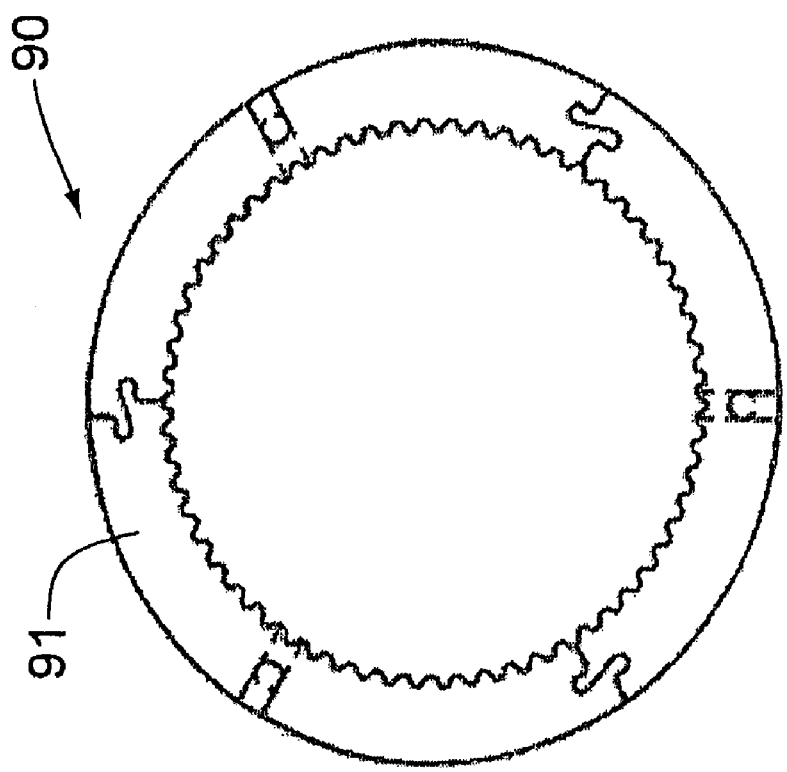
FIG. 9 is a plan view of a friction disk having a plurality of stocked core plates.

The third embodiment provides openings that are stamped into the segments. The segments are stacked or laminated to intersect circumferentially and create offset radial channels or openings into opposite edges of the segment to form oil passages into the plate or disc. FIGS. 9 and 10 shows a friction disk 90 having a stack of core plates formed of multiple segments as previously described. The friction disk 90 has two outer core plates 91 and a first interior core plate 93 and a second interior core plate 95 positioned in the stack between the two outer core plates 91. At least one opening 96 is formed in the first interior core plate 93 and at least one opening 97 is formed in the second interior core plate 95. The opening 96 on the first interior core plate 93 is disposed to be in alignment with the opening 97 in the second interior core plate 95 and the two openings form a passageway 99. The passageway 99 allows lubricating fluid used with the friction disk to flow through the friction disk and remove heat from the friction disk 90. It should be understood that the openings 96 and 97 can be formed to extend all the way through a portion of the core plate and would form a complete passageway through the friction disk. With such openings it would not be necessary to place the openings in alignment to form a passageway. With such openings it would also be possible to only use one interior core plate in the stack that forms the friction disk 90.

Figure 11A:
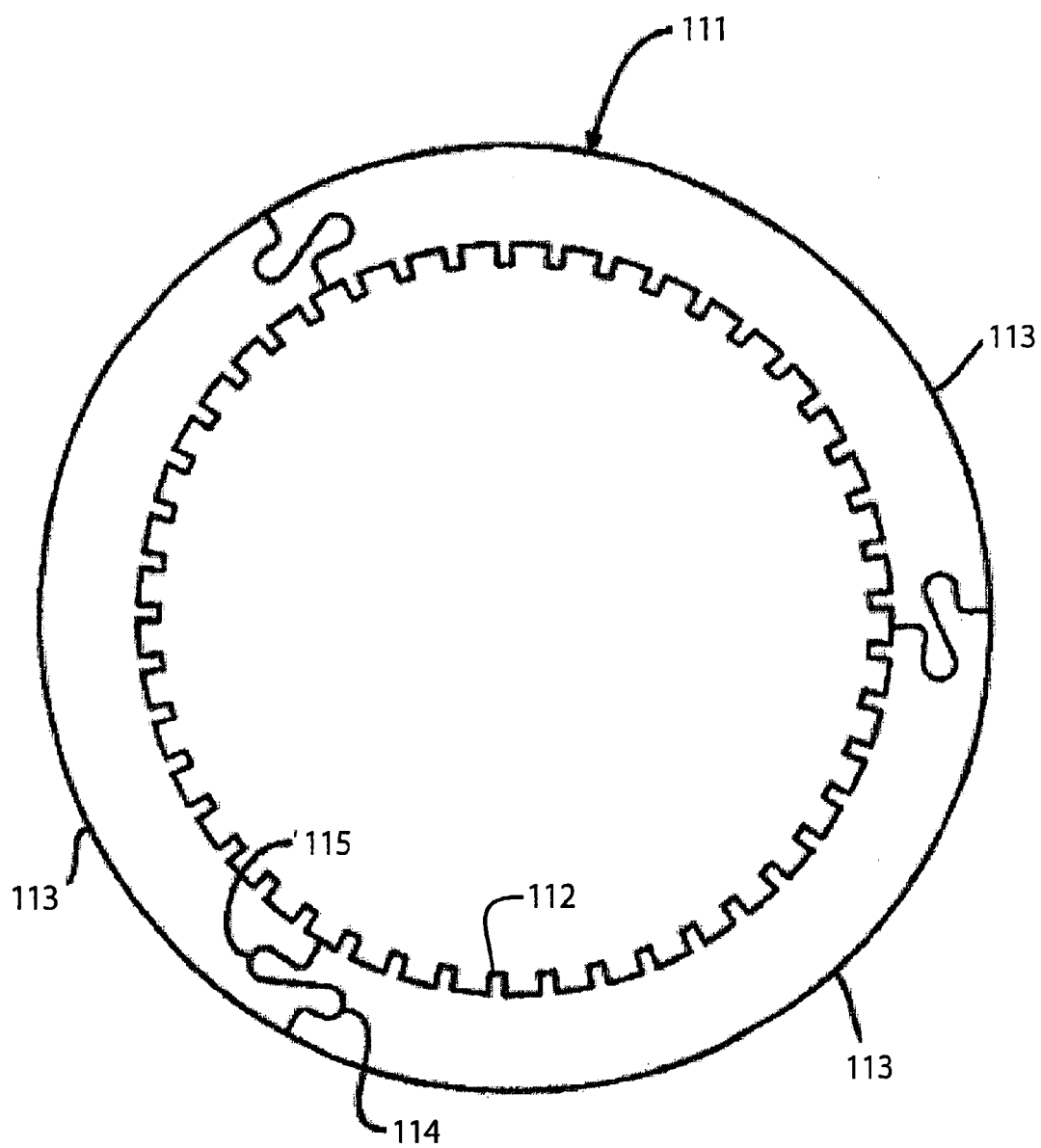
FIG. 11a is a front elevation view of a core plate of the present invention.

FIGS. 11a, b, and c. show a single layer core plate utilizing the features of the invention. The core plate 111 has a plurality of teeth 112 and the teeth may be on either the inner or outer periphery of the core plate 111. As shown in FIG. 11a, the teeth are on the inner periphery of the core plate. The core plate 111 is comprised of three identical arucate segments 113. Each segment 113 has a tab 114 and a slot 115 at opposing ends of the segment. The tab 114 and the slot 115 at either end are complimentary to and conformably receive a tab 114 or a slot 115 in the next adjacent segment. It should be understood that other shapes for the tab and slot arrangement can be useful for the segments shown in FIGS. 11a, b, and c. Such other shapes for the tab and slot arrangements are shown in FIGS. 7a through 7f herein. As discussed previously in this patent application the segments 113 that form the core plate 111 can be identical in size or in certain applications the segments 113 can have slight variations so that they are not all identical in size. The parameters for the core plate 111 that determine whether the segments 113 are identical or will have slight variations in size have been previously discussed in this patent application. In addition, the segments 113 are formed in the same manner as previously described in this patent application.

Figure 11B:
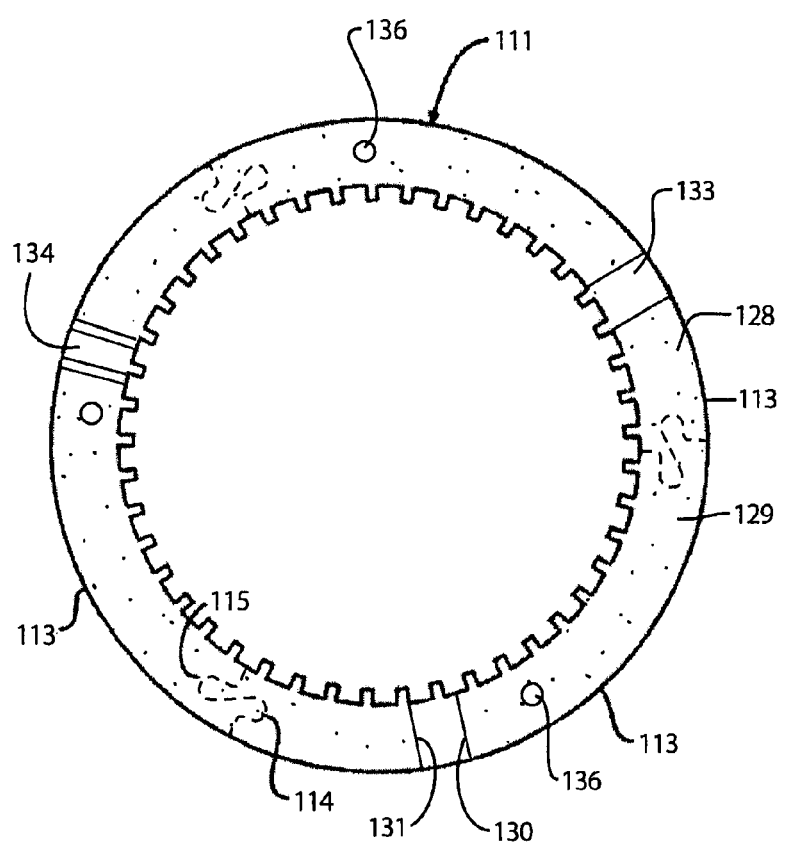
FIG. 11b is a front elevation view of the core plate of FIG. 11a with a friction material applied to the core plate.
Figure 11C:
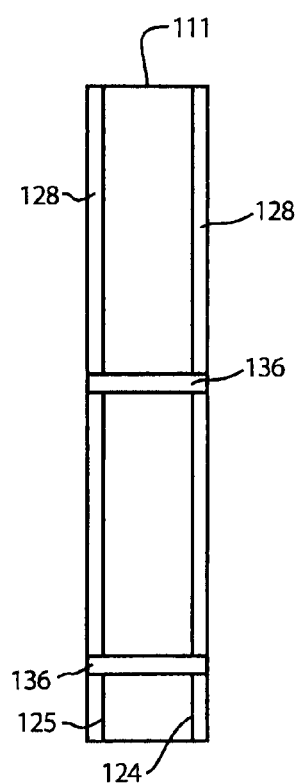
FIG. 11c is a side elevation view of the core plate of FIG. 11b.

Each segment 113 of the core plate 111 has a tab 114 and a slot 115 located on each end of the segment as previously described. The core plate 111 has a first surface 124 and a second surface 125 that in opposed spaced apart relationship with the first surface. The first and second surfaces of the core plate 111 are disposed to receive a friction material 128. The friction material 128 can be positioned on either the first surface 124, the second surface 125 or on both surfaces of the core plate 111. The friction material 128 is positioned on the core plate 111 in a manner whereby the friction material overlaps the first and second ends of the arcuate segments that form the core plate. This positioning of the friction material provides additional resistance to separation of the core plate segments. The friction material 128, as shown FIG. 11b, can be formed in a plurality of arcuate segments 129 where the arcuate segments have a first end 130 and a second end 131. The segments 129 of the friction material 128 are positioned on the core plate 111 in a manner whereby the segments 129 overlap the tabs 114 and slots 115 that forms the joint between the adjacent segments 113 that form the core plate 111. The friction material 128 can also be applied as a continuous annular ring on the first surface 124, the second surface 125 or both the first and second surfaces of the core plate 111. In this application the continuous annular ring of friction material 128 will cover the joints between the segments 113 of the core plate 111.

If the friction material 128 is applied to the core plate 111 and segments 129, the segments can be spaced apart to form grooves 133 for oil flow. It is also possible to form slots 134 in the core plate 111 where the slots are in alignment with the grooves 133 between the segments 129 of the friction material 128. The grooves 133 and slots 134 act to provide a passage way to improve oil flow along the surface of the friction element formed by the core plate 111 and the friction material 128. It is also possible to have apertures 136 that extend through the core plate 111 and the friction material 128. The apertures extend from the first surface 124 to the second surface 125 of the core plate 111 continue through the friction material 128. The apertures 136 allow oil to pass through the core plate 111 and the friction material 128 to equalize pressure that is present on either side of the friction element formed by the core plate 111 and the friction material 128.

Figure 12:
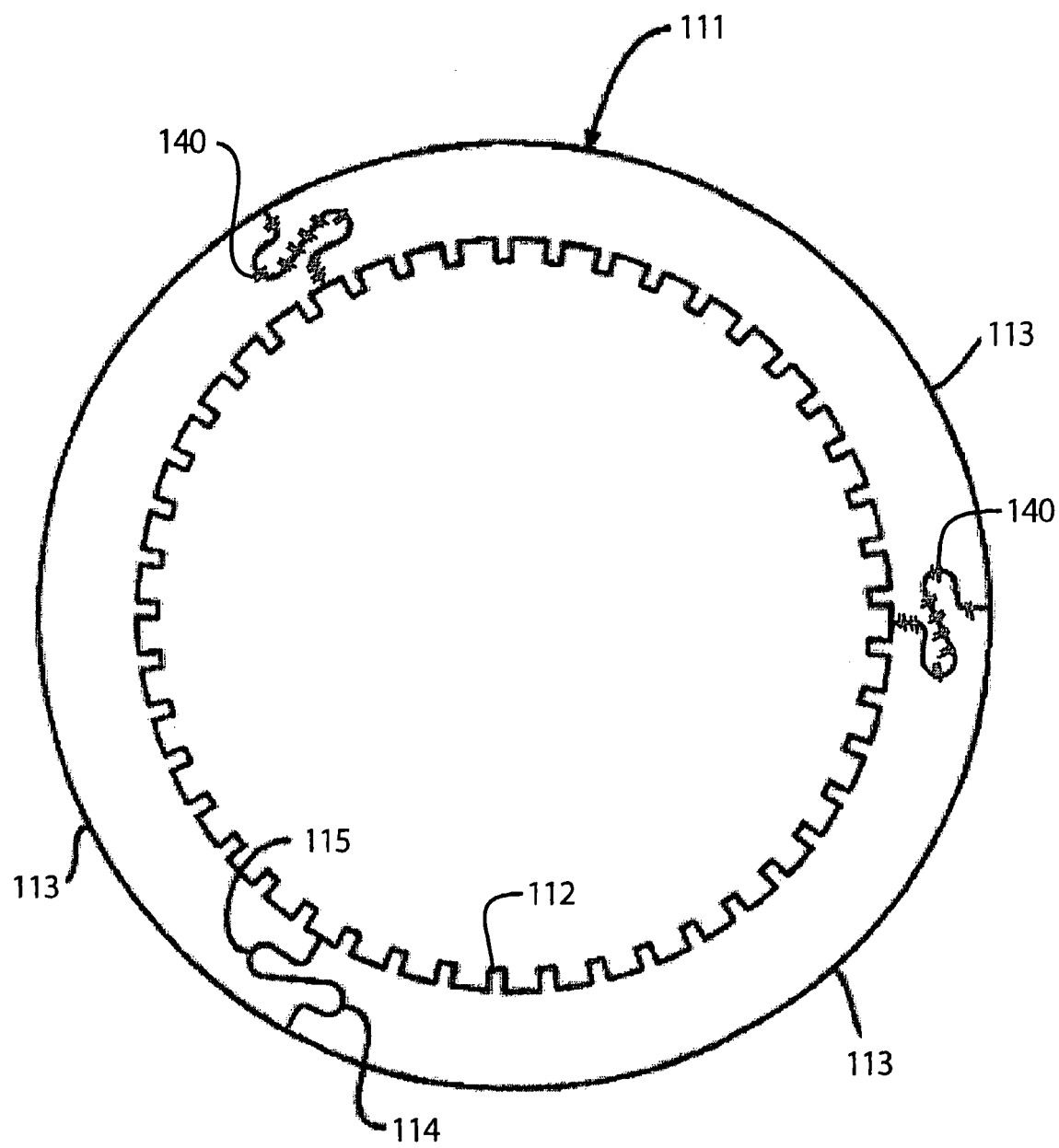
FIG. 12 is a front elevation view of a core plate with additional features for securing the segments together.
Figure 13:
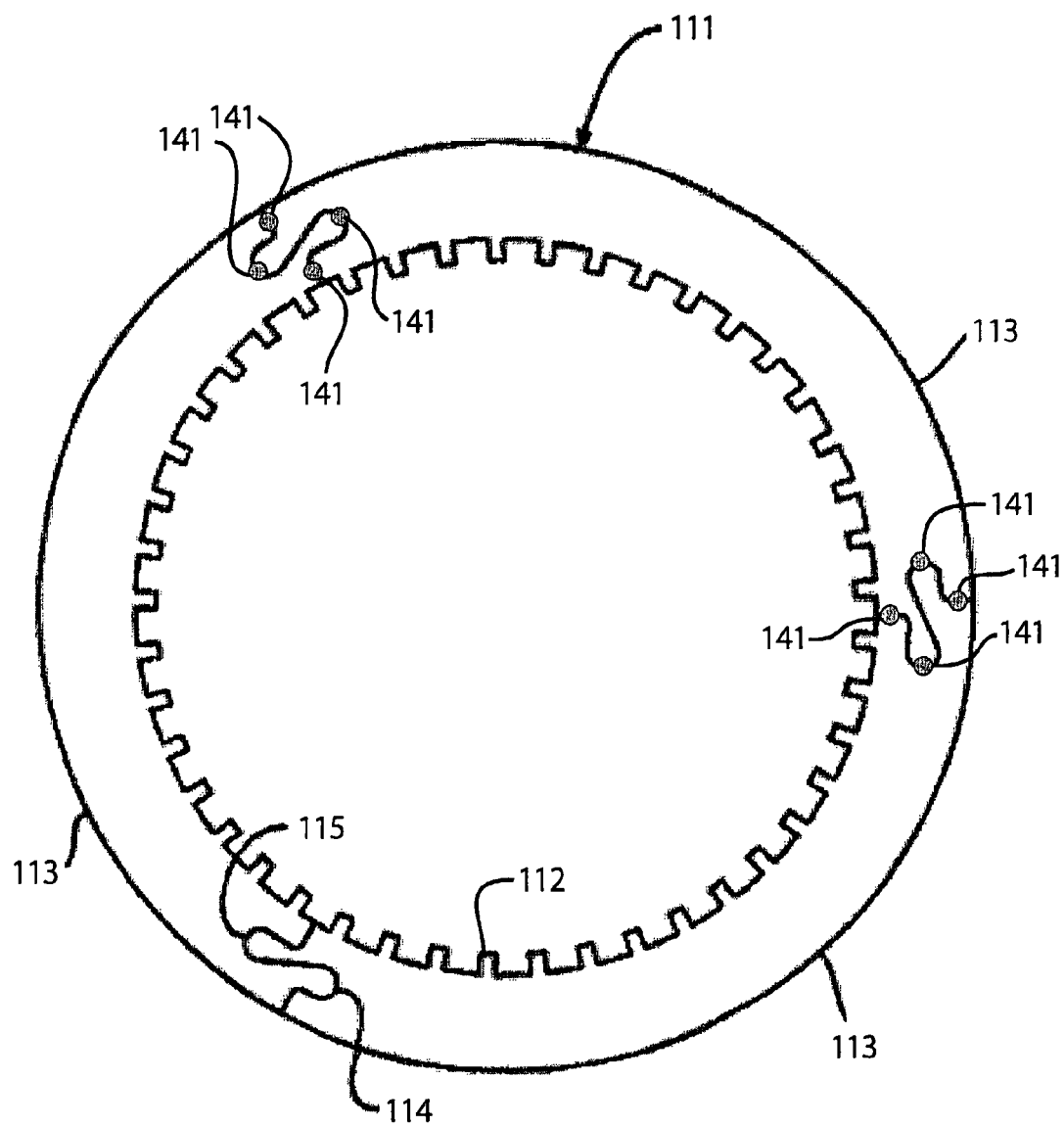
FIG. 13 is a front elevation view of a core plate with additional features for securing the segments together.

In forming a core plate 111 out of one group of segments 113 it is important that the joints formed between adjacent segments be strong enough to provide structural integrity for the core plate 111. The friction material 128 that overlies the joints between the segments 113 on at least the first surface 124 or the second surface 125 of the core plate 111 provide some resistance to separation between the segments that form the core plate. However, the friction material 128 is used for its friction characteristics and not as a structural element that provides strength to the core plate 111. To assist in providing structural integrity for the core plate 111 it has been found desirable to form the joint between adjacent segments 113 where the tab 114 and slot 115 interact to secure adjacent segments together. The configuration of the tab 114 and slot 115, as shown in the drawings, provides an interlock between adjacent segments 113 that can resist separation of the adjacent segments. It has been found preferable to have the tab 114 and slot 115 configured in a way that there is a very tight interference fit between the tab and the slot to add resistance to separation between adjacent segments 113 of the core plate 111. It is also possible to utilize welding, gluing, brazing and riveting in the area adjacent segments are joined together to further enhance the strength of the inner connection between adjacent segments 113 of the core plate 111. FIG. 12 shows a core plate 111 with welding, gluing or brazing 140 present on the joint between adjacent segments 113 of the core plate 111. FIG. 13 shows rivets 141 that have been utilized at the joint between adjacent segments 113 to add strength to the joint between adjacent segments that form the core plate 111.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A product comprising:
    a core plate for supporting an oil lubricated friction material, the core plate including a plurality of arcuate-shaped segments each having a first end and a second end, the first end of each segment defining a tab and the second end of each segment defining a slot, the tab on the first end of one segment being positioned in the slot of the second end of an adjacent segment in order to secure the segments together to form the core plate, at least one of the plurality of arcuate-shaped segments having an oil slot defined therein at a surface of the core plate and the oil slot being located near an outer periphery of the core plate, the oil slot having an axial depth with respect to the surface of the core plate which is less than the total axial depth of the core plate, the oil slot providing a flow path for oil during use of the core plate.

2. The product of claim 1 wherein the surface of the core plate is a first surface, is a second surface in opposed spaced apart relationship with the first surface, or is both the first and second surfaces, the first and second surface being disposed to receive a friction material.

3. The product of claim 2 wherein a friction material is positioned on at least one of the first and second surfaces, wherein the friction material overlaps the first and second ends of the arcuate-shaped segments of the core plate to resist separation of the core plate segments.

4. The product of claim 3 wherein the friction material is positioned on the first and second surfaces.

5. The product of claim 3 wherein the friction material is formed of a plurality of arcuate-shaped segments, the friction material segments having a first end and a second end.

6. The product of claim 5 wherein the segments forming the friction material are not oriented in the same position as the segments forming the core plate whereby the friction material segments overlap the first and second ends of the core plate segments.

7. The product of claim 6 wherein the friction material segments are positioned in spaced apart relationship on the core plate to form oil flow grooves between the friction material segments.

8. The product of claim 7 wherein the oil slot is positioned in alignment with the respective oil flow groove between the friction material segments so that oil flows in the oil flow groove and in the oil slot during use of the product.

9. The product of claim 7 wherein holes extend from the first surface to the second surface of the core plate segments to provide a path for oil flow to equalize fluid pressure action on the core plate.

10. The product of claim 9 wherein the holes in the core plate are in alignment with the oil flow grooves formed between the friction material segments.

11. The product of claim 7 wherein the first and second ends of the segments forming the core plate are bonded together by welding.

12. The product of claim 7 wherein the first and second ends of the segments forming the core plate are bonded together by gluing.

13. The product of claim 1 wherein the first and second ends of the segments forming the core plate are bonded together.

14. The product of claim 1 further comprising a friction material located on the surface of the core plate, the friction material including a plurality of arcuate-shaped segments, at least two neighboring friction material segments being spaced apart with respect to each other so that an oil flow groove is located between the respective opposing ends of the neighboring friction material segments, the oil flow groove being in alignment with the oil slot so that oil flows in the oil flow groove and in the oil slot during use of the product.

15. The product of claim 1 wherein the core plate has a plurality of spline teeth located around a periphery of the core plate and extending radially from the plurality of segments, wherein the total number of individual spline teeth is not evenly divisible by the total number of segments in the core plate so that a first number of individual spline teeth of the first segment of the core plate is different than a second number of individual spline teeth of the second segment of the core plate.

16. A multi-plate clutch pack including a plurality of core plates including at least a first core plate, a second core plate, and an interior core plate located between the first and second core plates, with one of the plurality of core plates being the core plate of claim 1, each of the plurality of core plates of the multi-plate clutch pack including a plurality of arcuate-shaped segments, wherein the interior core plate is missing at least one individual segment so that a channel is formed in order to allow oil flow in the multi-plate clutch pack.

17. The product of claim 16 wherein the first core plate has a plurality of perforations extending axially through at least one of the plurality of segments of the first core plate, and the interior core plate has an equal number of complementary-shaped projections as the plurality of perforations, the plurality of projections respectively engaging the plurality of perforations in order to lock the first core plate to the interior core plate.

* * * * *